(12) United States Patent
Barker

(10) Patent No.: US 6,237,876 B1
(45) Date of Patent: May 29, 2001

(54) METHODS FOR USING SATELLITE STATE VECTOR PREDICTION TO PROVIDE THREE-AXIS SATELLITE ATTITUDE CONTROL

(75) Inventor: Lee A. Barker, San Jose, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/627,482

(22) Filed: Jul. 28, 2000

(51) Int. Cl.[7] ............................................. B64G 1/24
(52) U.S. Cl. ................................. 244/164; 244/158 R
(58) Field of Search ............................... 244/158 R, 164, 244/172, 173

(56) References Cited

U.S. PATENT DOCUMENTS

| | | | |
|---|---|---|---|
| 5,067,672 | * 11/1991 | Bouzat | 244/158 R |
| 5,412,574 | * 5/1995 | Bender et al. | 364/455 |
| 5,546,309 | * 8/1996 | Johnson et al. | 364/434 |
| 5,595,360 | * 1/1997 | Spitzer | 244/158 R |
| 5,716,029 | * 2/1998 | Spitzer et al. | 244/158 R |
| 6,076,774 | * 6/2000 | Shah et al. | 244/164 |
| 6,116,543 | * 9/2000 | Koppel | 244/158 R |
| 6,142,422 | * 11/2000 | Stoen et al. | 244/164 |
| 6,145,790 | * 11/2000 | Didinsky et al. | 244/164 |

* cited by examiner

Primary Examiner—Michael J. Carone
Assistant Examiner—Kevin Jakel
(74) Attorney, Agent, or Firm—Kenneth W. Float

(57) ABSTRACT

Satellite attitude control methods for use during orbit raising operations to follow a predefined thrust trajectory that meets geometric constraints imposed by sensor and/or telemetry and control antenna fields of view while optimizing the sun angle on the solar array. The method uses low thrust electric propulsion for geosynchronous satellite orbit raising from a transfer orbit to the final geosynchronous orbit. In implementing the methods, a predefined thrust trajectory is generated that is designed to raise a satellite from a transfer orbit to a geosynchronous orbit. A direction-cosines matrix, or quaternion, is generated that aligns a thrust vector defined in the satellite body frame with the predefined thrust trajectory and rotates the satellite body about that vector. Attitude control is performed in accordance with the direction-cosines matrix to align the thrust vector defined in the satellite body frame with the predefined thrust trajectory and rotate the satellite body about that vector to optimize the sun angle on the solar array.

6 Claims, 6 Drawing Sheets

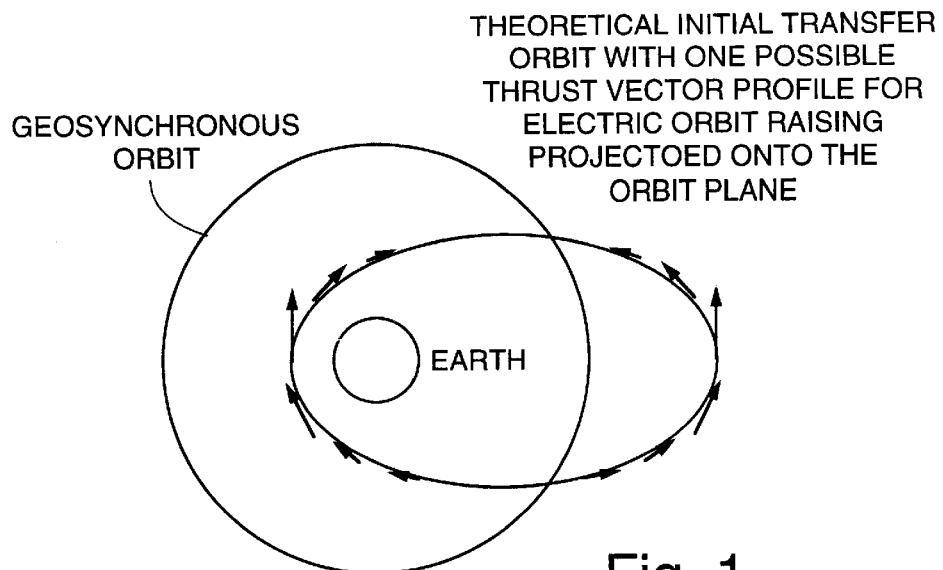
Fig. 1
Fig. 2
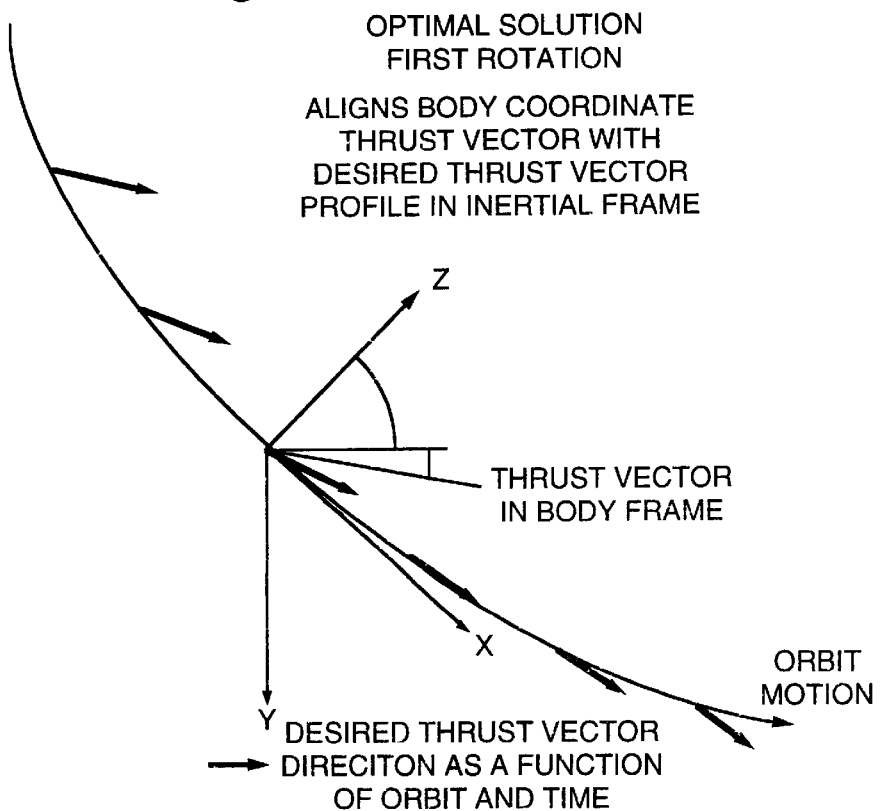

SOLUTION SECOND ROTATION

CASE 1- PLANE DEFINED BY SUN VECTOR IS WITHIN CONE OF SOLAR ARRAY AXIS:
ROTATE ABOUT THRUST VECTOR

SUN PLANE LIES INSIDE CONE OF SOLAR ARRAY AXIS AND THRUST VECTOR

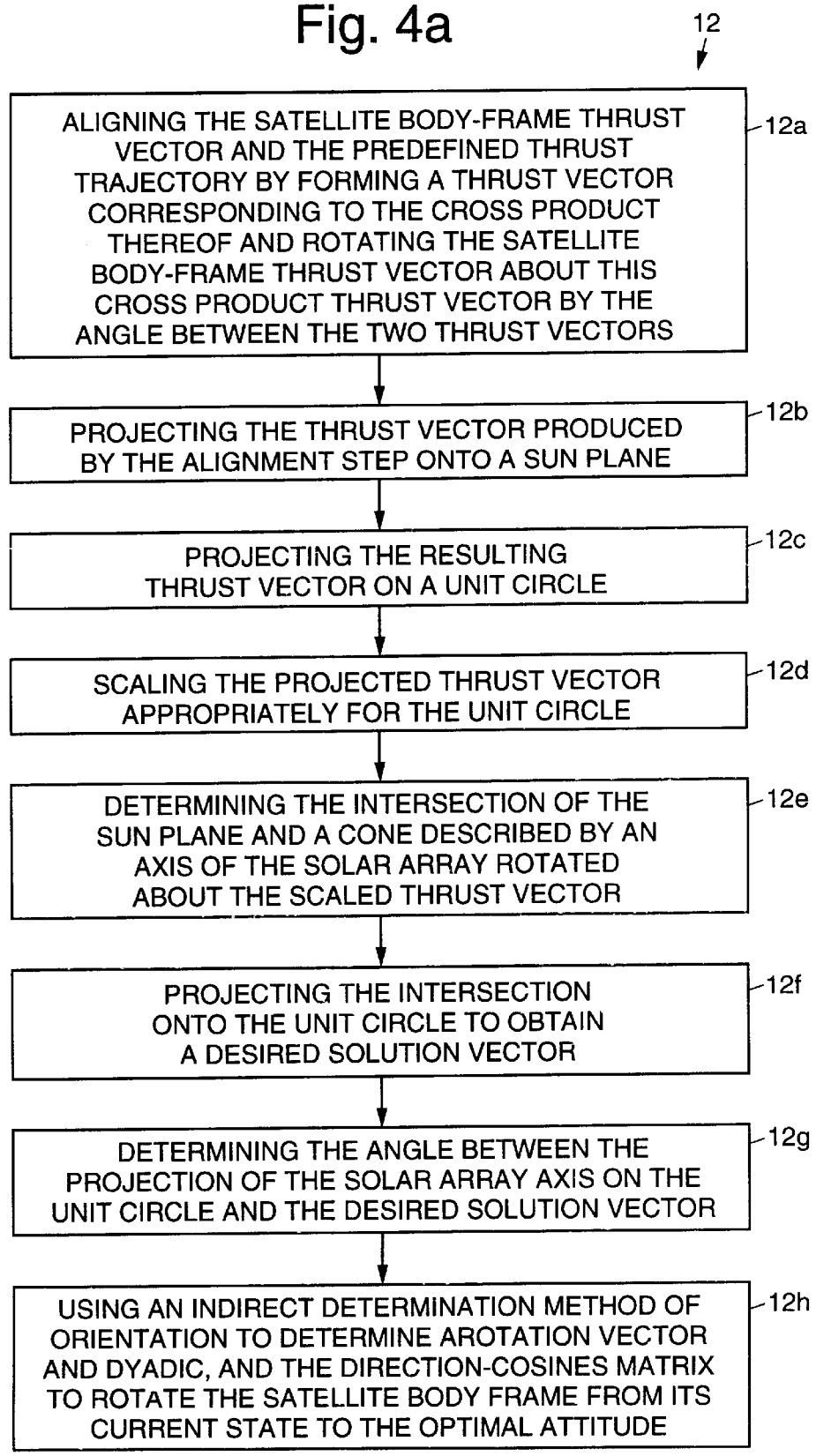

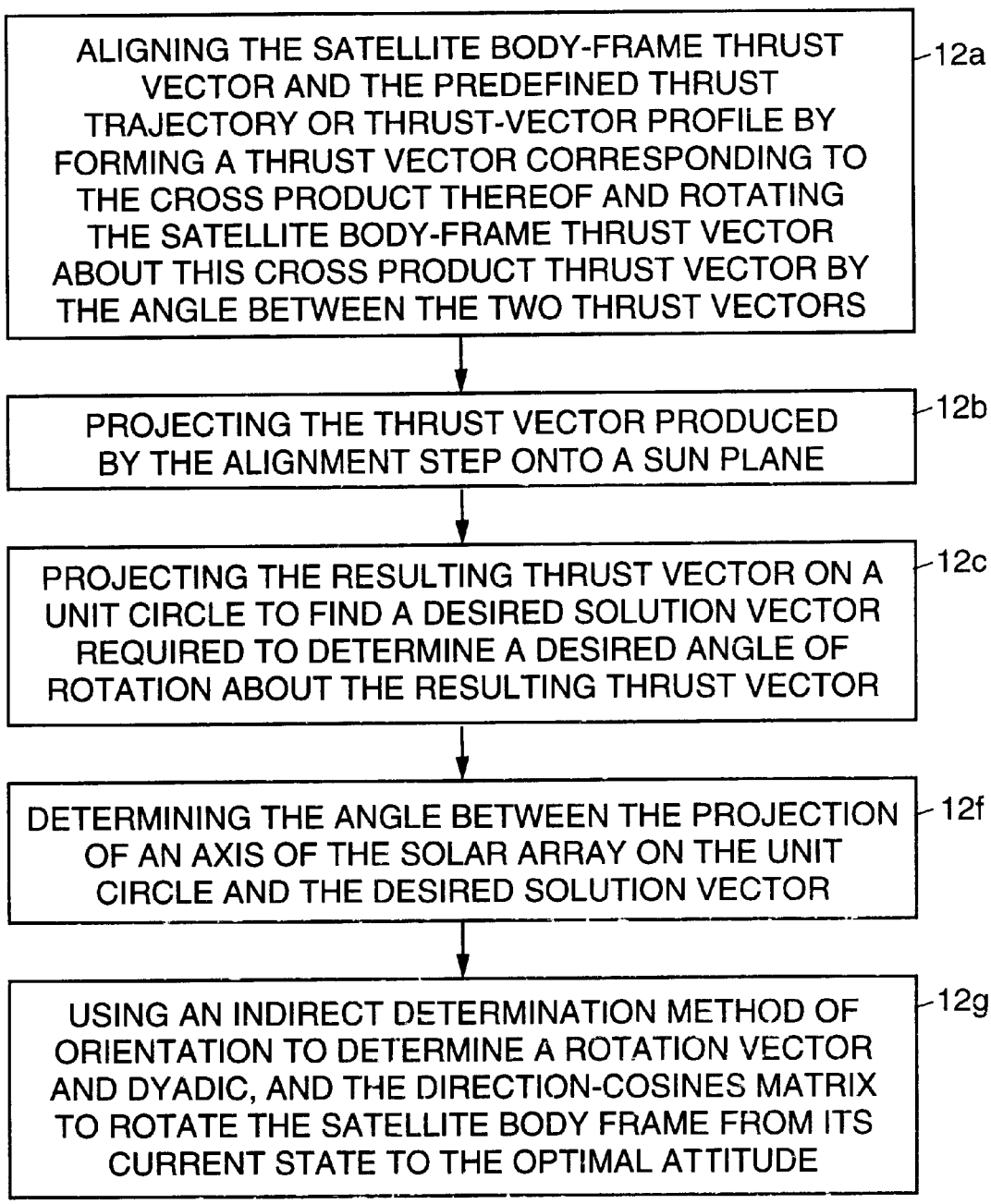

METHODS FOR USING SATELLITE STATE VECTOR PREDICTION TO PROVIDE THREE-AXIS SATELLITE ATTITUDE CONTROL

BACKGROUND

The present invention relates generally to satellites, and more particularly, to methods that use satellite state vector prediction to provide three-axis satellite attitude control.

Future satellites built by the assignee of the present invention may be tasked to perform electric orbit raising in order to reduce bipropellant requirements to reduce system mass (cost) and/or increase mission life. The Telstar 8 satellite deployed by the assignee of the present invention is tasked to perform on-orbit stationkeeping operations using electric propulsion.

The assignee of the present invention has developed a basic concept of operations for electric orbit raising in which a main (bipropellant) satellite thruster quickly raises future electric thruster-equipped (SPT-equipped) satellites from their initial transfer orbits to intermediate orbits above the Earth's radiation belts, where solar array degradation is no longer a problem. From this point, electric thrusters (SPTs) are used to complete orbit raising to the geosynchronous station over a relatively longer time frame (several weeks to months).

The electric thrusters perform this portion of the orbit raising more efficiently than a bipropellant thruster could. This is due primarily to the greatly increased specific impulse (Isp) of the electric thruster. The electric thruster has a much lower thrust level than its bipropellant counterpart, and, as a result, must operate over long periods of time and large portions of the orbit. Once on orbit, the electric thrusters switch roles to perform daily stationkeeping maneuvers to maintain the satellite in it's stationkeeping box.

The electric orbit raising concept developed by the assignee of the present invention is described in great detail in U.S. patent application Ser. No. 09/328,805, filed Jun. 9, 1999, entitled "Practical Orbit Raising System and Method for Geosynchronous Satellites", which is assigned to the assignee of the present invention. For the purposes of this description, the term "transfer orbit" may be the initial separation geosynchronous transfer orbit or any subsequent orbit prior to reaching the final geosynchronous orbit.

In order to accomplish the orbit-raising task, two major problems must be addressed. First, solutions must be developed to define the "correct" thrust profile that will inject the satellite from its new transfer orbit to its final orbit. The term "correct" means the desired thrust profile. This may be a profile optimized to do one or more of the following: 1) minimize orbit raising propellant, 2) minimize time to complete orbit raising, 3) maximize on-orbit life, 4) maintain some required power level on board during electric thruster (SPT) operations, or 5) minimize some cost function that is some combination of the above and/or any other variable that one might contrive. Once the desired orbit-raising thrust-vector trajectory has been defined, the second problem that must be addressed is controlling the satellite attitude along the resulting trajectory to achieve the goals of the strategy while maximizing power and meeting sensor and telemetry and control (T&C) constraints.

The present invention focuses on the task of controlling the attitude during the electric thruster (SPT) phase of orbit raising, "flying" the profile, in a manner that is operationally feasible. While it is not a formal system requirement, as the method is described, it will become apparent that the use of an on-board orbit propagator such as that used on Sirius Radio satellites developed by the assignee of the present invention, with some modifications, will allow a practical real time control solution with minimal ground system reliance and/or commanding. Therefore, an on-board orbit propagator may be a derived requirement in such a system.

Therefore, it is an objective of the present invention to provide for improved methods that use satellite state vector prediction to provide three-axis satellite attitude control.

SUMMARY OF THE INVENTION

To accomplish the above and other objectives, the present invention is a method of satellite attitude control that may be used during orbit raising operations to follow a predefined thrust trajectory (thrust-vector profile) and meet geometric constraints imposed by sensor and/or telemetry and control antenna fields of view while optimizing sun angle on the solar array (power). The method implements low thrust electric propulsion for geosynchronous satellite orbit raising from a transfer orbit to the final geosynchronous orbit.

An exemplary satellite attitude control method comprises the following steps. A predefined thrust trajectory or thrust-vector profile is generated that is designed to raise a satellite from a transfer orbit to a geosynchronous orbit. A direction-cosines matrix, or a quaternion, is generated that aligns a thrust vector defined in the satellite body frame with the predefined thrust trajectory or thrust-vector profile and rotates the satellite body about that vector. The spacecraft attitude control system is employed in accordance with the direction-cosines matrix to align the thrust vector defined in the satellite body frame with the predefined thrust trajectory or thrust-vector profile and rotate the satellite body about that vector in order to maximize power from the solar arrays while meeting imposed constraints.

The satellite is first rotated to align the body coordinate thrust vector with the desired thrust vector provided in an inertial reference frame. Then a second rotation is performed that optimizes the solar array axis angle with respect to the sun while meeting constraint imposed by various sensor 'keep out' zones or telemetry and commanding nulls.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates a possible thrust-vector trajectory superimposed upon the transfer orbit of the satellite;

FIG. 2 illustrates a sample thrust vector in a satellite body frame at one instant in time along an orbital path and several desired thrust vectors representing the desired thrust-vector trajectory along the orbital path;

FIGS. 4a and 4b show alternative embodiments of a portion of the satellite attitude control methods illustrated in FIG. 4.

DETAILED DESCRIPTION

Figure 3A:
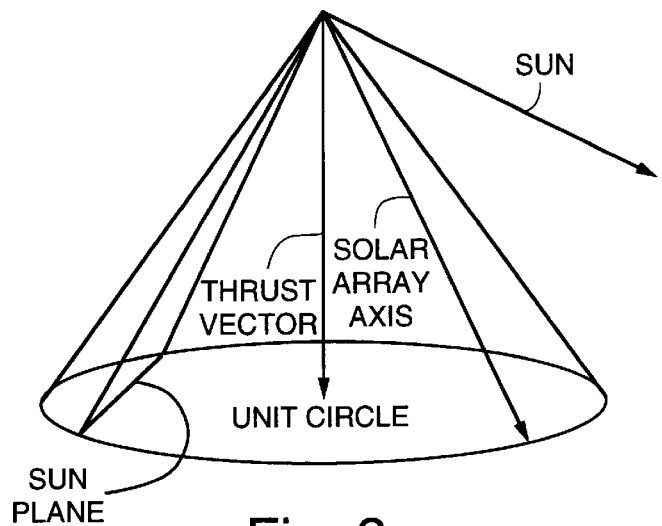
FIGS. 3a–3b illustrate rotation of the satellite about a newly-oriented thrust vector as in FIG. 2 to place the solar array axis in the sun plane, the plane perpendicular to the sun vector, a first exemplary case.
Figure 3B:
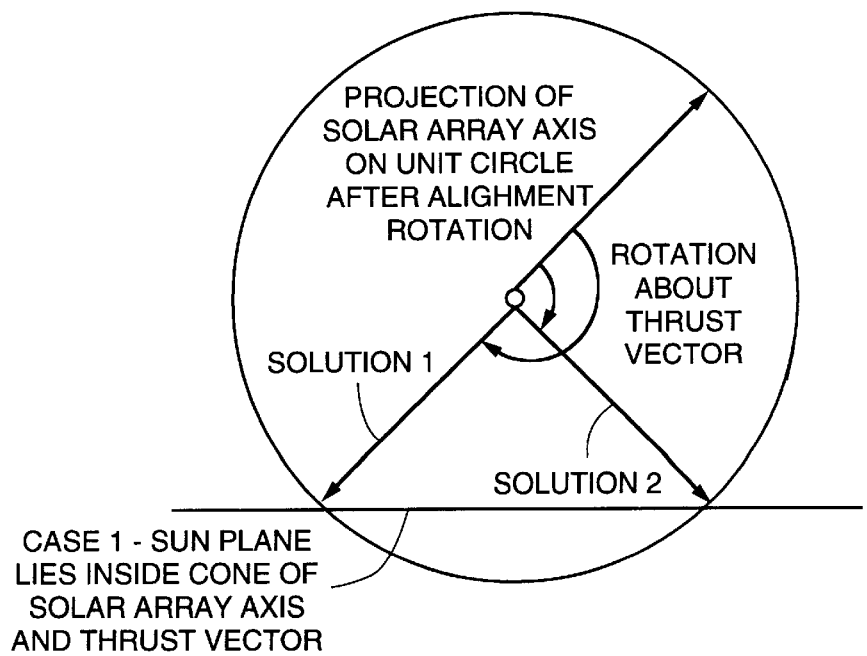
Figure 3C:
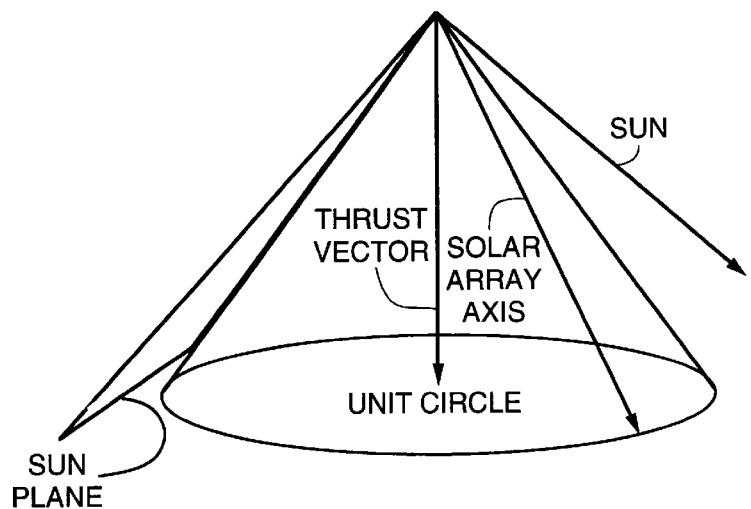
FIGS. 3c–3d illustrate rotation of the satellite about a newly-oriented thrust vector as in FIG. 2 to place the solar array axis in the sun plane, the plane perpendicular to the sun vector, for a second exemplary case.
Figure 3D:
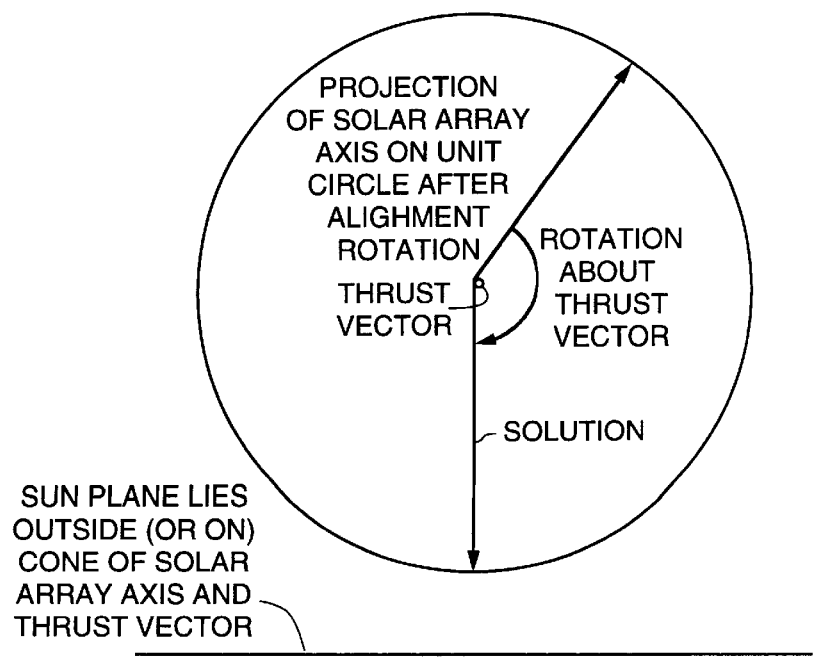

The present invention is adapted to control the attitude of a satellite during the electric thruster phase of orbit raising, "flying" the profile, in a manner that is operationally feasible. The use of an on-board orbit propagator, such as that used on Sirius Radio satellites developed by the assignee of the present invention, in conjunction with the present invention, provides for a practical real time control solution with minimal ground system reliance and/or commanding.

The present invention is a method of satellite attitude control that may be used during orbit raising operations to follow a predefined thrust trajectory and meet geometric constraints imposed by sensor and/or telemetry and control antenna fields of view while optimizing sun angle on the solar array (power). The method implements low thrust electric propulsion in geosynchronous satellite orbit raising from a transfer orbit to the final geosynchronous orbit. However, it is to be understood that nothing in this method limits it to low thrust propulsion or these specific initial and target orbits. The method is independent of a three-axis reference source and, depending on implementation, may be used with star trackers, digital integrated rate assemblies (DIRAs) or gyro sensors, or any combination of sensors that provide three-axis reference.

Assume that a time-varying electric orbit raising thrust-vector trajectory has been defined by ground software in some reference frame. Referring to the drawing figures, FIG. 1 illustrates a possible thrust-vector trajectory superimposed upon the transfer orbit of the satellite. As orbit raising continues, each subsequent orbital revolution may have similar thrust-vector trajectories that vary by some amount as the current orbit approaches the target orbit.

The example illustrated in FIG. 1 shows a super-synchronous transfer orbit where it has been determined that the maneuver will be divided into two segments with thrust around apogee raising perigee and thrust about perigee reducing apogee. However, nothing in this method precludes the use of sub-synchronous transfer orbits, continuous thrusting throughout the orbit, and/or thrust-vector profiles that alter any or all of the orbital parameters.

It is desired to steer the thrust vector in the satellite body frame along the desired thrust-vector trajectory. The satellite thrust vector may be from a single thruster or it may be the sum thrust vector of multiple thrusters. It may be time varying due to changes in satellite center of mass. The key is that it must be definable in the satellite body frame to some acceptable level of accuracy. A desirable quality of this thrust vector is that it passes through, or very close to, the center of mass of the satellite for momentum management purposes.

The preferred reference frame of the thrust-vector trajectory is that frame to which attitude control will be referenced. For example, if a star tracker is used, the desired reference frame is an inertial frame. If the satellite is going to reference its motion to the orbit frame, as might be the case with digital integrated rate assembly (gyro) control, then the trajectory is referenced to the orbit frame.

To avoid large uploads containing many vectors that would be piecewise fit together to form the trajectory as a function of time, it would be desirable to express this time varying trajectory as a function of orbital position. This might allow the expression of hundreds or thousands of thrust vectors in terms of in-track (horizontal), cross-track, and radial components as simple sinusoidal functions of the orbit position or anomaly. An on-board orbit propagator will know the orbital position and could compute the desired vector components. These vectors could then be expressed in the desired reference frame. This is also easily implemented, since the required direction-cosines matrices are computed by the orbit propagator. At this point, a real-time computation may be performed, at orbit propagator step interval, of the desired thrust profile in the desired reference frame.

Next, the thrust vector in the body frame must be determined. This is a function of thruster placement, alignment, current thruster gimbal angles, and the thruster(s) chosen to perform the maneuver. Determination of this vector in the body frame can be performed on the ground or with software on-board the satellite, and loaded into memory on the satellite for use by attitude-profile generation software. Again, using direction-cosines matrices provided by the orbit propagator, the body-frame thrust vector is transformed into the reference frame of the desired thrust-vector trajectory. It is assumed here that three-axis attitude knowledge is present, whether from a star tracker, digital integrated rate assemblies (gyro), or other sensor.

With both the desired thrust vector and satellite body-frame thrust vector in common reference frames, the motion required to align the satellite thrust vector with the desired thrust vector may be determined. FIG. 2 illustrates a sample thrust vector in a satellite body frame at one instant in time along an orbital path (assuming the body is flying in an orbit-normal attitude) and several desired thrust vectors representing the desired thrust-vector trajectory along the orbital path. Alignment of these two vectors at any point along the orbit is accomplished by forming the cross product of these two vectors and rotating about this cross product vector by the angle between the two thrust vectors. Similarly, the solar array axis is rotated by the same amount about the same cross product vector.

The second step is to rotate the satellite about the newly-oriented thrust vector to place the solar array axis in the sun plane, the plane perpendicular to the sun vector. In a simplified case where the thrust vector is along the satellite body z-axis (aligned along satellite main satellite thruster), and the array axis is aligned with the body y-axis (aligned along the satellite solar-array axis), the result is a solution similar to yaw steering and it is always possible to find at least two solutions that place the array axis perpendicular to the sun vector. As the location of the thrust vector in the body frame is moved closer to the solar array axis, as is the case with electric orbit raising using a single electric thruster on either the north or south minus z corner of the satellite, the geometry becomes a little more complicated. Depending on the sun-vector location in the body frame, a single solution that maximizes the sun angle on the solar array is achievable, or a choice of two solutions that place the solar array in the sun plane is achievable. It is necessary to rotate the satellite body about the thrust vector to obtain one of the above-described solutions or some modification to that solution based upon other geometric constraints. FIG. 3 illustrates this second rotation for each case described.

The rotation of the solar-array axis about the thrust vector can be determined geometrically by projecting the solar-array axis and its cone of rotation onto a plane normal to the thrust vector. The circle projected by the cone is normalized and centered about the thrust vector. In case 1, project the thrust vector onto the sun plane, project the result on the unit circle and scale appropriately for the unit circle. It is trivial to determine the angular separation of the two solutions and subsequently, the desired angle about the thrust vector through which the solar array axis must rotate to place it in one of the two solutions in the sun plane. For case 2, project the thrust vector onto the sun plane and project the result on the unit circle to find the second vector required to determine the desired angle of the rotation about the thrust vector.

Having both the satellite thrust vector oriented with the desired thrust-vector trajectory and the satellite solar-array axis (the y-axis in this case) properly oriented, using the present invention, it is possible to use the indirect determination method of orientation, described in "Spacecraft Dynamics", by Thomas R. Kane, et al., 1983, to determine the rotation vector and dyadic, and subsequently the direction-cosines matrix (or a quaternion), to rotate the satellite body frame from its current state to the electric orbit raising optimal attitude.

It is possible to design sensor "keep out" zones or antenna coverage zones in the satellite body frame. Using the orbit propagator's knowledge of the sun, moon, Earth, and any other bodies that might be significant, the inertial to body direction-cosines matrix that is calculated on board can be used to project these objects into the body frame and take appropriate action in the event an intrusion occurs or a constraint is reached. For example, if it is determined that a bright object is within the "keep out" zone of the primary star tracker, attitude sensing may be switched to a secondary star tracker.

The present method has been successfully simulated in its simplest form following a simulated predefined electric orbit raising profile and providing the required pitch, roll, and yaw profiles. The above algorithm has been coded and tested using a Sirius Radio prototype C++ code as a baseline. A super-synchronous transfer orbit was chosen, and the orbit-raising thrust-vector trajectory was contrived in a simple manner to test the algorithm. The orbit propagator and state vector products including desired attitude solutions have been verified to function correctly. In addition to those provided to the Sirius Radio satellite, the state vector products include the direction-cosines matrices (or the quaternions) from inertial space to the electric orbit raising attitude and projections of the Earth, sun, and moon into the body frame for this orientation.

Figure 4:
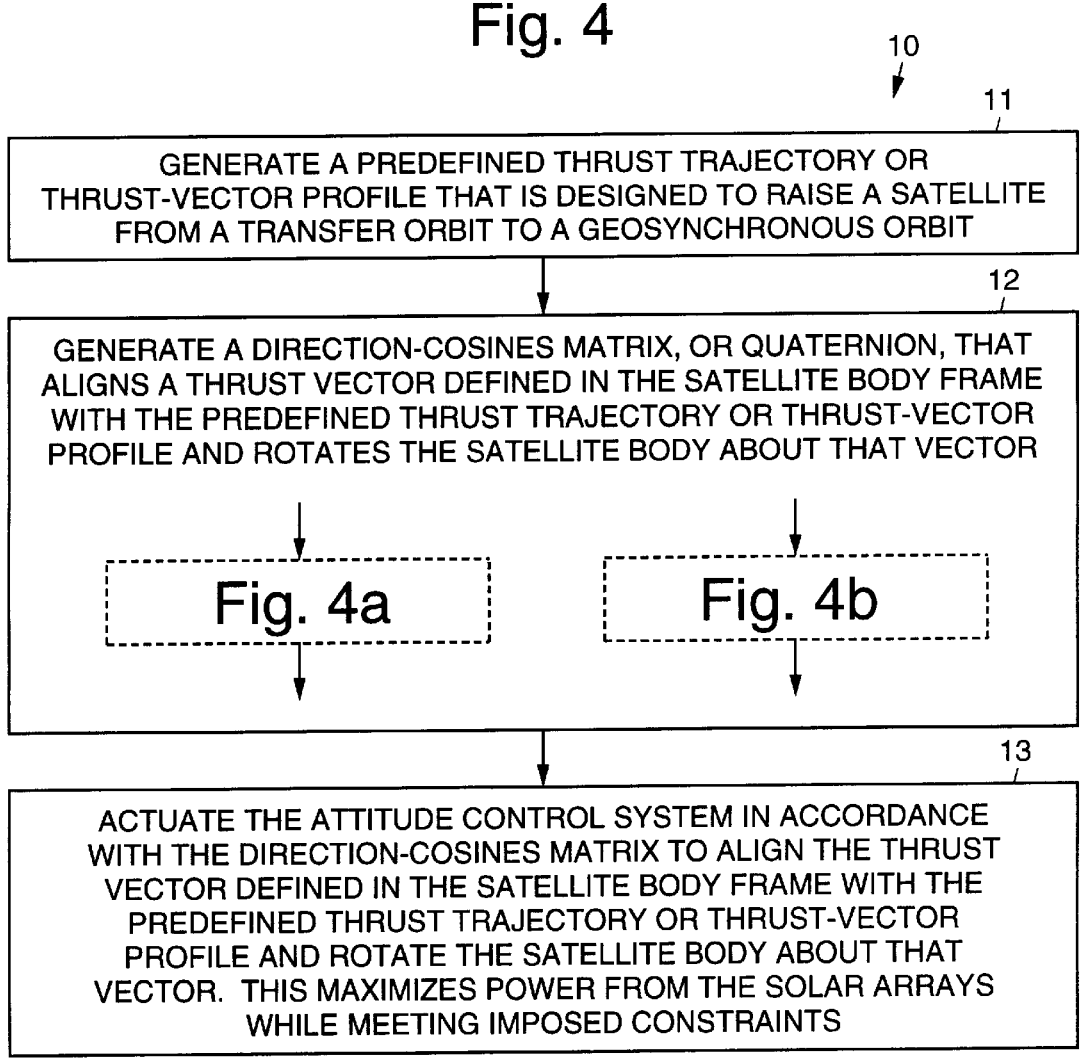
FIG. 4 is a flow diagram illustrating exemplary satellite attitude control methods in accordance with the principles of the present invention.

With the above in mind, FIG. 4 is a flow diagram illustrating exemplary satellite attitude control methods 10 in accordance with the principles of the present invention. An exemplary satellite attitude control method 10 comprises the following steps.

A predefined thrust trajectory or thrust-vector profile is generated 11 that is designed to raise a satellite from a transfer orbit to a geosynchronous orbit. A direction-cosines matrix, or the quaternion, is generated 12 that aligns a thrust vector defined in the satellite body frame with the predefined thrust trajectory or thrust-vector profile and rotates the satellite body about that vector. Electric thrusters are fired 13 in accordance with the direction-cosines matrix to align the thrust vector defined in the satellite body frame with the predefined thrust trajectory or thrust-vector profile and rotate the satellite body about that vector. This maximizes power from the solar arrays while meeting imposed constraints.

Details of the processing performed to generate the direction-cosines matrix, or the quaternion, are shown in FIGS. 4a and 4b. In one embodiment, shown in FIG. 4a, the direction-cosines matrix, or the quaternion, is generated 12 by aligning 12a the satellite body-frame thrust vector and the predefined thrust trajectory or thrust-vector profile by forming a thrust vector corresponding to the cross product thereof and rotating the satellite body-frame thrust vector about this cross product thrust vector by the angle between the two thrust vectors. Then, the thrust vector produced by the alignment step is projected 12b onto a sun plane. The resulting thrust vector is projected 12c on a unit circle. The projected thrust vector is scaled 12d appropriately for the unit circle.

The intersection of the sun plane and a cone described by an axis of the solar array rotated about the scaled thrust vector is determined 12e. The intersection is projected 12f onto the unit circle to obtain a desired solution vector. The angle between the projection of the solar array axis on the unit circle and the desired solution vector is determined 12g. An indirect determination method of orientation is then used 12h to determine a rotation vector and dyadic, and the direction-cosines matrix (or quaternion) to rotate the satellite body frame from its current state to the optimal attitude.

In another embodiment, shown in FIG. 4b, the direction-cosines matrix, or the quaternion, is generated 12 by aligning 12a the satellite body-frame thrust vector and the predefined thrust trajectory or thrust-vector profile by forming a thrust vector corresponding to the cross product thereof and rotating the satellite body-frame thrust vector about this cross product thrust vector by the angle between the two thrust vectors. The thrust vector produced by the alignment step is projected 12b onto a sun plane.

The resulting thrust vector is projected 12c on a unit circle to find a desired solution vector required to determine a desired angle of rotation about the resulting thrust vector. The angle between the projection of an axis of the solar array on the unit circle and the desired solution vector is determined 12f. An indirect determination method of orientation is then used 12g to determine a rotation vector and dyadic, and the direction-cosines matrix (or quaternion) to rotate the satellite body frame from its current state to the optimal attitude.

The present methods 10 do not find or optimize the orbit raising thrust trajectory. The methods use the predefined thrust trajectory (thrust-vector profile) to generate the direction-cosines matrix, or the quaternion, to align a thrust vector defined in the satellite body frame with the predefined thrust-vector profile and rotate the satellite body about that vector to maximize power from the solar arrays while meeting imposed constraints.

Once the infrastructure required on the satellite to perform electric orbit raising is in place, there will be many possible uses of this same architecture in the on-orbit life of the satellite to reduce ground operations cost and improve performance. These include momentum management and on-orbit control, for example.

Thus, methods have been disclosed that uses satellite state vector prediction to provide attitude control and automatically inhibit satellite sensor scans and/or provide sensor switching to perform low thrust (electric thruster) satellite orbit raising. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A satellite attitude control method for use with a satellite having a solar array, comprising the steps of:

generating predefined thrust trajectory or thrust-vector profile that is designed to raise a satellite from a transfer orbit to a geosynchronous orbit;

generating a direction-cosines matrix that is used to alien a thrust vector defined in the satellite body frame with the predefined thrust trajectory or thrust-vector profile and that is used to rotate the satellite body about the generated thrust vector to an optimal attitude; and actuating the attitude control system in accordance with the direction-cosines matrix to align the thrust vector defined in the satellite body frame with the predefined thrust trajectory or thrust-vector profile and rotate the satellite body about that vector to an optimal attitude.

2. The method recited in claim 1 wherein the step of generating the direction-cosines matrix comprises the steps of:

forming a vector corresponding to the cross product of the satellite body-frame thrust vector and the predefined thrust trajectory or thrust-vector profile and rotating the satellite body-frame thrust vector about this cross product vector by the angle therebetween;

projecting the vector produced by the alignment step onto a sun plane;

projecting the resulting vector projection on a unit circle centered about the thrust vector to obtain a second projected vector;

scaling the second projected vector appropriately for the unit circle;

determining the intersection of the sun plane and a cone described by an axis of the solar array rotated about the scaled vector;

projecting the intersection onto the unit circle to obtain desired solution vectors;

determining the angle between the projection of the solar array axis on the unit circle and the desired solution vector; and using an indirect determination method of orientation to determine a rotation vector and dyadic which are used to determine the direction-cosines matrix.

3. The method recited in claim 1 wherein the step of generating the direction-cosines matrix comprises the steps of:

forming a vector corresponding to the cross product of the satellite body-frame thrust vector and the predefined thrust trajectory or thrust-vector profile and rotating the satellite body-frame thrust vector about this cross product vector by the angle therebetween;

projecting the vector produced by the alignment step onto a sun plane;

projecting the resulting vector projection on a unit circle to find a desired solution vector required to determine a desired angle of rotation about the resulting thrust vector;

determining the angle between the projection of an axis of the solar array on the unit circle and the desired solution vectors; and using an indirect determination method of orientation to determine a rotation vector and dyadic which are used to determine the direction-cosines matrix.

4. A satellite attitude control method for use with a satellite having a solar array, comprising the steps of:

generating predefined thrust trajectory or thrust-vector profile that is designed to raise a satellite from a transfer orbit to a geosynchronous orbit;

generating a quaternion that is used to align a thrust vector defined in the satellite body frame with the predefined thrust trajectory or thrust-vector profile and that is used to rotate the satellite body about the generated thrust vector to an optimal attitude; and actuating the attitude control system in accordance with the quaternion to align the thrust vector defined in the satellite body frame with the predefined thrust trajectory or thrust-vector profile and rotate the satellite body about that vector to an optimal attitude.

5. The method recited in claim 4 wherein the step of generating the quaternion comprises the steps of:

forming a vector corresponding to the cross product of the satellite body-frame thrust vector and the predefined thrust trajectory or thrust-vector profile and rotating the satellite body-frame thrust vector about this cross product vector by the angle therebetween;

projecting the vector produced by the alignment step onto a sun plane;

projecting the resulting vector projection on a unit circle centered about the thrust vector to obtain a second projected vector;

scaling the second projected vector appropriately for the unit circle;

determining the intersection of the sun plane and a cone described by an axis of the solar array rotated about the scaled vector;

projecting the intersection onto the unit circle to obtain desired solution vectors;

determining the angle between the projection of the solar array axis on the unit circle and the desired solution vectors; and using an indirect determination method of orientation to determine a rotation vector and dyadic which are used to determine the quaternion.

6. The method recited in claim 4 wherein the step of generating the quaternion comprises the steps of:

forming a vector corresponding to the cross product of the satellite body-frame thrust vector and the predefined thrust trajectory or thrust-vector profile and rotating the satellite body-frame thrust vector about this cross product vector by the angle therebetween;

projecting the vector produced by the alignment step onto a sun plane;

projecting the resulting vector projection on a unit circle to find a desired solution vector required to determine a desired angle of rotation about the resulting thrust vector;

determining the angle between the projection of an axis of the solar array on the unit circle and the desired solution vector; and using an indirect determination method of orientation to determine a rotation vector and dyadic which are used to determine the quaternion.

* * * * *